United States Patent [19]

Conciatori et al.

[11] 4,035,437

[45] July 12, 1977

[54] POLYAMIDE RESIN COMPOSITIONS

[75] Inventors: Anthony B. Conciatori, Chatham; Robert W. Stackman, Morristown, both of N.J.

[73] Assignee: Celanese Corporation, New York, N.Y.

[21] Appl. No.: 663,136

[22] Filed: Mar. 2, 1976

Related U.S. Application Data

[62] Division of Ser. No. 558,873, March 17, 1975, abandoned.

[51] Int. Cl.² .......................................... C08L 75/00
[52] U.S. Cl. ...................... 260/857 TW; 260/78 R
[58] Field of Search ............................ 260/857 TW

[56] References Cited

U.S. PATENT DOCUMENTS

| | | | |
|---|---|---|---|
| 2,806,877 | 9/1957 | Koenecke | 260/523 |
| 3,335,114 | 8/1967 | Huffman | 260/78 |
| 3,393,252 | 7/1968 | Zimmerman | 260/857 TW |
| 3,426,000 | 2/1969 | Ridgway | 260/78 |
| 3,432,575 | 3/1969 | Zimmerman | 260/857 TW |
| 3,683,047 | 8/1972 | Honda | 260/857 TW |

FOREIGN PATENT DOCUMENTS

| | | | |
|---|---|---|---|
| 44-28318 | 11/1969 | Japan | 260/857 TW |
| 45-22348 | 7/1970 | Japan | 260/857 TW |
| 46-27824 | 12/1971 | Japan | 260/857 TW |

OTHER PUBLICATIONS

Frunze, T.M. et al, Formation of Mixed Polyamides, High Molecular Wt. Cmpds. (U.S.S.R.) 1, pp. 500–505 (1959) Apr., No. 4.

*Primary Examiner*—Paul Lieberman

[57] ABSTRACT

This invention relates to high molecular weight polyamide resin compositions which are uniquely stable under hydrolytic conditions. The polyamide resin compositions are produced by the condensation of a diamine with a sterically-hindered neo-acid derivative such as $\alpha,\alpha,\alpha',\alpha'$-tetramethyl-p-phenylenediacetic acid.

3 Claims, No Drawings

POLYAMIDE RESIN COMPOSITIONS

This is a division, of application Ser. No. 558,873, filed Mar. 17, 1975, now abandoned.

BACKGROUND OF THE INVENTION

Polyamide resin compositions have found wide commercial acceptance because they can be formed into strong abrasion-resistant fibers and films. Those skilled in the art have endeavored to develop new types of polyamide resins which have improved dyeing properties, high impact strength, high tensile modulus, low temperature flexibility, thermal and chemical stability, and the like. Wholly aromatic polyamide resins exhibit improved thermal and chemical stability, but they have the disadvantage of being insoluble in common organic solvents, and their melting points are too high for convenient processing into useful articles by melting of the polymeric material.

Polyamide resin compositions tend to be susceptible to hydrolytic condtions and corrosive environments. The amido moieties in polyamide resin compositions are highly reactive and readily enter into chemical transformations. For example, in the production of polyamide block copolymer resins, it is a serious disadvantage that transamidation occurs, and the resultant resins have a random configuration rather than an authentic block copolymer structure.

Accordingly, it is an object of the present invention to provide polyamide resin compositions which have improved thermal and chemical stability.

It is another object of this invention to provide high molecular weight polyamide resin compositions which are soluble in ordinary solvents and can be conveniently converted into fibers, films and molded articles.

It is a further object of the present invention to provide a process for producing resinous linear polyamide block copolymers wherein transamidation between prepolymer reactants is suppressed.

Other objects and advantages shall become apparent from the following description and examples.

DESCRIPTION OF THE INVENTION

One or more objects of the present invention are accomplished by the provision of thermally and chemically stable polyamide resins comprising substantially the recurring structural unit:

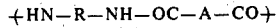

wherein R is a divalent organic radical containing between 1 and about 20 carbon atoms; and A is selected from the radicals

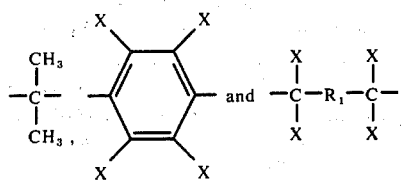

wherein $R_1$ is a single bond or a divalent aliphatic radical containing between 1 and about 12 carbon atoms; and X is selected from methyl and halogen.

The R substituent is preferably a divalent aliphatic or aromatic radical containing between 1 and about 12 carbon atoms, and is most preferably an alkylene group containing between 1 and about 10 carbon atoms.

The $R_1$ substituent is preferably a single bond or an alkylene group containing between 1 and about 10 carbon atoms.

The X substituent is preferably selected from methyl, chlorine, fluorine or bromine, and is most preferably either methyl or chlorine.

The novel polyamide resin compositions of the present invention are produced by the condensation of diamine and a sterically-hindered neo-acid derivative which are selected to provide the recurring structural moieties represented in the general formula described hereinabove.

Illustrative of the preferred neo-acid derivatives which can be employed in the production of the invention polyamide resins are the following structures:

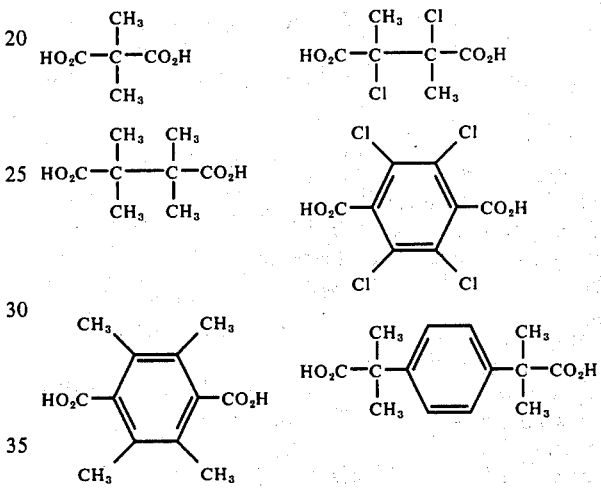

It is known in the art that neo-acid derivatives can be prepared by the addition of carbon monoxide to olefins in the presence of catalysts. For example, the reaction of isobutylene with carbon monoxide in the presence of hydrogen ions results in the formation of neo-pentanoic acids. This synthetic method can also be employed to produce neo-dicarboxylic acids.

Neo-acids can also be produced by other synthesis methods. For example, p-phenylene bis (dimethylacetic acid) may be obtained by the two-step hydrolysis of the corresponding dinitrile wherein the first step is carried out at a temperature of 90° to 125° C. in the presence of phosphoric acid and the second step is conducted by heating this intermediate at reflux with an alkali metal hydroxide. This process is fully described in U.S. Pat. No. 3,285,956. In addition, acids of the following formula:

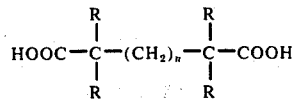

wherein R is alkyl and n is an integer of 1 to 10, may be prepared by a multi-step synthesis involving reacting a 2,2-dialkylacetyl halide with an alkali metal salt of trialkylcarbinol in the presence of liquid ammonia to form a trialkylcarbinyl-2,2-dialkylacetate, reacting this material with metallic sodium in liquid ammonia to give the sodium salt of the trialkylcarbinyl-2,2-dialkylacetate, reacting the latter material with an alkylene dihalide and hydrolyzing the resultant product to produce the 2,2,8,8-tetraalkyl substituted acid. This synthesis is more fully described in U.S. Pat. No. 3,210,404.

In a further procedure for preparing starting materials for use in this invention, diacids of the formula:

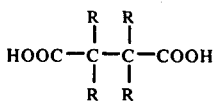

wherein R is alkyl or halogen, may be prepared by the reaction of a compound of the formula:

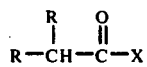

wherein X is hydroxyl, halogen or an alkoxy group, with acetyl peroxide wherein the reactants are mixed at about 0° C. and thereafter heated at temperatures up to about 70°–100° C. This synthesis is fully described in U.S. Pat. No. 2,426,224.

The diamine reactant which is condensed with the neo-acid to produce polyamide resin compositions include compounds such as ethylenediamine; trimethylenediamine; hexamethylenediamine; 1,4-cyclohexanediamine; phenyldiamines; toluenediamines; 2,5-dimethylhexamethylenediamine; 2,17-diaminoeicosadecane; 4,4'-diaminodiphenyl sulfide; 4,4'-diaminodiphenyl ether; 1,4-diaminonaphthalene; 1,4-diaminonaphthalene; and the like.

In most cases conventional methods for producing polyamide resins can be employed to provide the present invention polyamide resin compositions. The effect of the sterically-hindered structure of the neo-diacid employed as a reactant causes the condensation of the neo-diacid with the diamine to proceed more slowly and with greater difficulty than in the case of the average type acid-amine condensation reaction. For this reason it is preferred to react the neo-diacid in the form of an acid chloride derivative. A suitable procedure is described in U.S. Pat. No. 2,989,495 for the condensation of an aromatic di-acid chloride with an aromatic diamine. Approximately equimolar quantities of di-acid and diamine are condensed at a temperature below about 100° C.

In another method for producing the invention polyamide resin compositions, the dicarboxylic acid and diamine react exothermically in the presence of a small amount of water to form the corresponding diamine salt of the dicarboxylic acid. This salt is then heated, preferably under reduced pressure and in an inert atmosphere, to dehydrate the salt to form the amide bonds.

For polyamides which melt higher than about 280° C., it is preferred to use a solid phase polymerization process. According to this technique, a prepolymer is first prepared by heating the diamine salt of the dicarboxylic acid. The prepolymer is then comminuted to form solid particles and these particles are subsequently heated to a temperature sufficient to accomplish further polymerization but below the temperature at which the particles begin to appreciably cohere.

These polyamides generally have an inherent viscosity of at least 0.4 as measured using 0.25 gram of polymer in 100 ml. of a solvent such as 97 percent sulfuric acid or formic acid.

The novel polyamides of this invention are soluble in many solvents such as formic acid, dimethylformamide, dimethylsulfoxide, trifluoroacetic acid, and the like. Films or fibers may be spun or cast from solutions of the polyamides by conventional techniques. The polyamides may be melt spun according to conventional techniques into fibers and the spun fibers drafted and heat treated to give high melting fibers.

The polyamides may also be molded by the usual injection, compression, or extrusion processes to form molded objects, tubes, extruded rods, and the like, which are generally clear and transparent.

A particularly important embodiment of the present invention is the provision of a process for producing novel resinous linear polyamide block copolymer which are characterized by improved properties such as thermal stability, excellent resistance to corrosive and hydrolytic environments, resistance to degradation by high energy particle and gamma ray radiation, low flammability, high tensile modulus, and a melting point above about 300° C.

The polyamide block copolymers of the present invention are prepared by condensing two or more prepolymer compositions, one of which corresponds to the general formula:

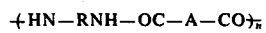

wherein R and A are organic radicals as defined hereinabove, and $n$ is an integer between about 3 and 20.

The preferred block copolymers are those in which the two or more prepolymer compositions which are condensed have different structural configurations but all corresponding to the above defined general formula. These preferred polyamide block copolymers have an excellent combination of desirable properties. This is attributable to the unique steric structure of the condensed prepolymer moieties. Little or no transamidation occurs during the process of condensation polymerization of the prepolymers. This relates to the inhibited reactivity of the amide linkages in the prepolymer compositions which is a steric hindrance phenomenon. The suppression of transamidation equilibration reactivity eliminates undesirable random block copolymerization. This has the important advantage of providing a means of custom synthesizing block copolymers with precisely defined properties.

In one method of producing the preferred polyamide block copolymer compositions of the present invention, a prepolymer is prepared by condensing a diamine such as hexamethylenediamine with an excess of a neo-dicarboxylic acid such as α, α, α', α', -tetramethyl-p-phenylenediacetic acid chloride. A second prepolymer is prepared by condensing an excess of diamine such as phenylenediamine with a neo-carboxylic acid such as tetrachloroterephthalic acid chloride. The two prepolymers are blended together in a solvent such as chloroform, and subjected to copolymerization reaction conditions to yield a polyamide block copolymer having an inherent viscosity above 0.4, and a melting point above about 300° C.

The polyamide resin compositions of the present invention are thermoplastic and can be transformed into homogeneous clear dopes which are readily converted by melt-spinning into fibers or by injection molding into shaped articles. Various fillers, pigments, dyes lubricants, plasticizers, and the like, can be incorporated into the polyamide resin compositions as required.

The following examples are further illustrative of the present invention. The reactants and other specific ingredients are presented as being typical, and various modification can be devised in view of the foregoing disclosure within the scope of the invention.

EXAMPLE 1

Preparation of $\alpha, \alpha, \alpha', \alpha'$-Tetramethyl-p-phenylenediacetyl Chloride To a 250 ml. three-necked flask equipped with stirrer, reflux condenser with drying tube, and nitrogen inlet is added 10 grams $\alpha, \alpha, \alpha', \alpha'$-tetramethyl-p-phenylenediacetic acid and 50 grams thionyl chloride. The mixture is heated at reflux for a period of 8 hours. The excess thionyl chloride is removed by distillation and the residue is distilled under reduced pressure to yield $\alpha, \alpha, \alpha', \alpha'$-tetramethyl-p-phenylenediacetyl chloride, B.P. 135° C. at 5 mm. Hg. pressure.

EXAMPLE 2

Preparation of Poly(hexamethylene $\alpha, \alpha, \alpha', \alpha'$-tetramethyl-p-phenylenediacetamide)

To a Waring Blender jar is added a solution of 3.49 grams hexamethylene diamine, 75 ml. H O, 1.3 grams sodium hydroxide and 0.05 gram sodium lauryl sulfate. The solution is stirred, and a solution of 8.61 grams tetramethyl-p-phenylenediacetyl chloride in 30 ml. chloroform is added. The mixture is stirred for five minutes, and the polyamide is recovered by filtration and washed free of surfactant with distilled water and dried in a vacuum oven at 60° C. for 8 hours.

The polyamide has an inherent viscosity of 0.30 dl/g (measured as 0.4% solution in formic acid), and melts at 185°–189° C.

EXAMPLE 3

Preparation of $\alpha, \alpha, \alpha', \alpha'$-Tetramethylpimelic Acid a. Preparation of 2,6-dimethyl-2,6-dichloroheptane To a 500 ml. three-necked flask, equipped with gas inlet tube, stirrer and reflux condenser is added 124 grams of 2,6-dimethyl-1,6-heptadiene (1.0 mole). Through the addition tube is added slowly 75 grams of gaseous hydrogen chloride. The reaction mixture is cooled during the course of the addition. After the hydrogen chloride addition (3 hours), the mixture is heated to 100° C. and a nitrogen sweep is maintained for two hours to remove excess hydrogen chloride.

b. Preparation of $\alpha, \alpha, \alpha', \alpha'$-tetramethylpimelio acid

To a 5-liter three-necked flask, equipped with stirrer, reflux condenser and addition funnel, is charged 2000 ml. anhydrous ether and 55 grams of magnesium turnings. A small amount (6 ml.) of the 2,6-dimethyl-2,6-dichloroheptane is added and the mixture stirred until refluxing commences. The reaction is cooled by means of an ice bath and the remainder of the 2,6-dimethyl-2,6-dichloroheptane prepared above is added dropwise over a three hour period. At the end of the addition period the mixture is stirred for one hour, then the reaction mixture is poured into a breaker containing about 500 grams of crushed dry ice ($CO_2$). When the mixture is warmed to room temperature the ether is allowed to evaporate and the residue is treated with 1000 ml. of a 35% hydrochloric acid solution to free the desired acid. The product is recrystallized twice from ether to yield a white solid, M.P. 168°–168.5° C.

c. Preparation of $\alpha, \alpha, \alpha', \alpha'$-tetramethylpimeloyl chloride To a 500 ml. one-necked flask is added 100 grams of $\alpha, \alpha, \alpha', \alpha'$-tetramethylpimelic acid and 250 grams thionyl chloride. The mixture is refluxed for four hours during which time hydrogen chloride and sulfur dioxide are evolved. At the end of this period the excess thionyl chloride is removed by distillation and the residue recrystallized twice from cyclohexane to yield pure $\alpha, \alpha, \alpha', \alpha'$-tetramethylpimeloyl chloride.

EXAMPLE 4

Preparation Of Poly(1,3-propylene-2,2,6,6-tetramethylpimelamide)

To a 250 ml. three-necked flask equipped with stirrer, nitrogen inlet and condenser, is added 25.3 grams of 2,2,6,6-tetramethylpimeloyl chloride, 100 grams of 1-methyl-2-pyrrolidinone, 7.4 grams 1,3-diaminopropane and 10 grams of magnesium oxide. The mixture is slowly heated to 150° C. with stirring, and maintained at this temperature for five hours. At the end of this period the reaction mixture is cooled, filtered, and poured into rapidly stirred water to precipitate the polyamide. The polymer is washed four times with distilled water then dried overnight in a vacuum oven at 80° C. The polymer has an inherent viscosity of 0.54 dl/g (measured as a 0.4% solution in formic acid solution).

EXAMPLE 5

Preparation Of Amine-terminated Prepolymer From $\alpha, \alpha, \alpha', \alpha'$-Tetramethyl-p-phenylenediacetic Acid And Ethylenediamine Into 500 ml. three-necked flask equipped with a stirrer, addition funnel and nitrogen inlet is added 7.2 grams (0.12 mole) ethylenediamine, 75 ml. dimethylacetamide and 8 grams of magnesium oxide. To the stirred mixture is added a solution of 21.6 grams (0.1 mole) $\alpha, \alpha, \alpha', \alpha'$-tetramethyl-p-phenylenediacetyl chloride in 25 ml. dimethylformamide. The reaction mixture is stirred for one hour at room temperature.

EXAMPLE 5A

Preparation Of Acid Chloride-terminated Prepolymer From $\alpha, \alpha, \alpha', \alpha'$-Tetramethyl-p-phenylenediacetyl Chloride And 1,12-Dodecanediamine Into a 500 ml. three-necked flask equipped with stirrer, nitrogen inlet and addition funnel, is added 20 grams (0.1 mole) 1,12 dodecanediamine, 75 ml. dimethylacetamide and 8 grams magnesium oxide. To the stirred mixture is added a solution of 26 grams (0.12 mole) $\alpha, \alpha, \alpha', \alpha'$-tetramethyl-p-phenylenediacetyl chloride in 25 ml. dimethylacetamide, and the reaction mixture is stirred for one hour at room temperature.

EXAMPLE 6

Preparation Of A Block Copolymer

To the reaction mixture obtained in Example 5 (amine-terminated polyamide) is added the solution of the acid chloride-terminated polyamide obtained in Example 5A. The mixture is stirred at 100° C. for 2 hours to assure complete reaction. The block copolyamide is isolated by pouring the viscous reaction mixture into rapidly stirred water in a Waring Blender. The polymer is washed three times in the blender with water and twice with methanol. The polymer has the following type structure:

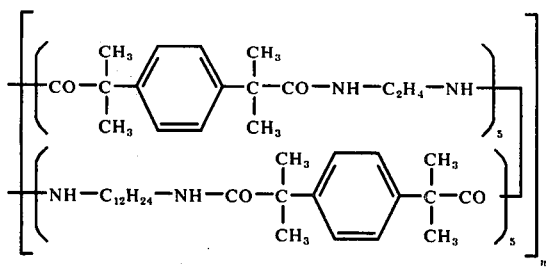

EXAMPLE 7

Preparation of Tetramethylterephthaloyl Chloride

To a 500 ml. three-necked flask equipped with stirrer, reflux condenser and nitrogen inlet, is added 100 grams tetramethylterephthalic acid and 200 ml. thionyl chloride. The mixture is stirred at reflux for six hours during which time the acid dissolves and a mixture of sulfur dioxide and hydrogen chloride is evolved. At the end of this period the excess thionyl chloride is removed by distillation. The residue, which is crude tetramethylterephthaloyl chloride, is recrystallized twice from cyclohexane.

EXAMPLE 8

Preparation Of m-Phenylenetetramethylterephthalamide Polymer

Into a 1500 ml. resin flask equipped with stirrer and nitrogen inlet is added a solution of 5.4 grams m-phenylenediamine in 700 grams of tetramethylurea. To the cooled solution (0° C.) is added 12.95 grams tetramethylterephthaloyl chloride. The mixture is stirred for 3 hours, then the viscous mixture is poured into rapidly stirred water to precipitate the polymer. The recovered polyamide is washed five times in a Waring Blender with water then dried overnight in a vacuum oven at 85° C. The polymer has an inherent viscosity of 5.2 dl/g (measured as a 0.1% solution in 98% $H_2SO_4$).

EXAMPLE 9

Preparation Of Poly(tetramethylenetetrachloroterephthalamide)

To a 250 ml. three-necked flask equipped with stirrer, nitrogen inlet and condenser is added 24.1 grams tetrachloroterephthaloyl chloride (Diamond Shamrock Chemical Co.), 100 grams dimethylformamide, 8.8 grams 1,4-diaminobutane. The mixture is stirred at reflux for five hours. The resulting solution is poured into a large excess of water to precipitate the polyamide. The polymer is washed several times with distilled water and dried in a vacuum oven at 80° C. overnight. The polymer has an inherent viscosity of 0.42 dl/g (measured at 0.4% concentration in 97% $H_2SO_4$ solution at 25° C.) and has a melting range of 265°–270° C.

EXAMPLE 10

Preparation Of 2,3-Dichloro-2,3-dimethylsuccinoyl Chloride

To a 500 ml. three-necked flask equipped with stirrer, condenser and gas inlet tube, is added 25 grams (0.2 mole) 2,3-dimethylsuccinic acid in 200 ml. carbon tetrachloride. The reaction flask is shielded from light, and 15 grams (0.21 mole) chlorine gas is added through the gas addition tube. The mixture is stirred for 2 hours after the addition is complete. At the end of this period the solvent is removed under vacuum and 50 grams thionyl chloride is added. The mixture is refluxed for eight hours, then the excess thionyl chloride is removed under vacuum. The residue is recrystallized twice from cyclohexane to yield 37 grams (59%) of 2,3-dichloro-2,3-dimethylsuccinoyl chloride.

EXAMPLE 11

Preparation Of Poly(1,5-pentane-2,3-dimethyl-2,3-dichlorosuccinamide)

To a 1 gallon Waring Blender is added 25.54 grams (0.25 mole) 1,5-diaminopentane, 400 ml. distilled water, 11.2 grams sodium hydroxide and 0.01 gram sodium lauryl sulfate. To this rapidly stirred solution is added a solution of 63 grams 2,3-dimethyl-2,3-dichlorosuccinoyl chloride in 100 ml. chloroform. The mixture is stirred for 10 minutes, and the polyamide is recovered by filtration. The polyamide is washed twice in the blender with methanol followed by five water washes. The polymer is dried overnight in a vacuum oven. The polyamide has an inherent viscosity of 0.62 dl/g (measured as a 0.1% solution in 97% $H_2SO_4$).

EXAMPLE 12

Acid Chloride-terminated Polyamide From Tetramethylterephthaloyl Chloride And 1,3-diaminocyclohexane To a 500 ml. three-necked flask equipped with stirrer, reflux condenser and addition funnel are added 28.45 grams (0.2 mole) 1,3-diaminocyclohexane, 150 ml. dimethylacetamide and five grams magnesium oxide. To the stirred solution is added 64.75 grams tetramethylterephthaloyl chloride (0.25 mole). The mixture is stirred for one hour to produce an acid chloride terminated polyamide with a degree of polymerization of four.

EXAMPLE 12A

Amine-terminated Polyamide From 1,8-Diaminooctane with 2,3-dimethyl-2,3-dichlorosuccinoyl Chloride To a 500 ml. three-necked flask equipped with stirrer, reflux condenser and addition funnel, are added 36.06 grams (0.25 mole) 1,8-diaminooctane, 200 ml. dimethylacetamide and five grams magnesium oxide. To the stirred solution is added 50.4 grams (0.2 mole) 2,3-dimethyl-2,3-dichlorosuccinoyl chloride. The mixture is stirred for two hours to yield an amine-terminated polyamide of degree of polymerization of four.

EXAMPLE 13

Preparation Of A Block Copolymer

The reaction mixture from example 12 [acid chloride-terminated polyamide (D.P. 4) from tetramethylterephthaloyl chloride with 1,3-diaminocyclohexane] is added to the reaction mixture from example 12A [amine-terminated polyamide (D.P. 4) from 2,3-dimethyl-2,3-dichlorosuccinoyl chloride with 1,8-diaminooctane]. The mixture is stirred for 4 hours at 80° C. The polyamide block polymer is isolated by pouring the reaction mixture into rapidly stirred water in a Waring Blender. The precipitated polyamide is washed three times with a dilute (1%) HCl solution and four times with water, and then dried in a forced air oven at 100° C. for 8 hours. The block polymer has an inherent viscosity of 0.87 dl/g (measured as a 1% solution in 97% $H_2SO_4$). The polymer has a structure of the following type:

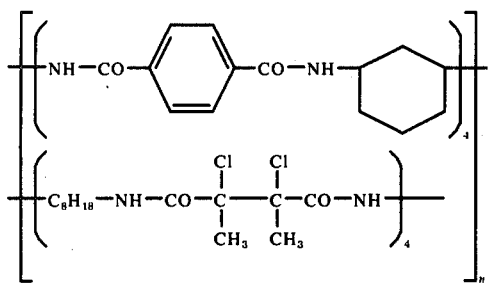

EXAMPLE 14

Preparation Of Dimethylmalonyl Chloride

To a 500 ml. one-necked flask equipped with reflux condenser with drying tube, is added 50 grams (0.38 mole) dimethylmalonic acid (Aldrich Chemical Co.) and 300 ml. thionyl chloride. The mixture is heated to reflux for about 1 hour during which time the dimethylmalonic acid is dissolved and hydrogen chloride and sulfur dioxide are evolved. The unreacted thionyl chloride is removed by distillation under reduced pressure. The residue is recrystallized twice from cyclohexane to yield a white solid, M.P. 186°–187° C.

EXAMPLE 15

Preparation Of Poly(1,12-dodecane-3,3-dimethylmalonamide)

To a Waring Blender jar is added a solution of 2.0 grams 1,12-diaminododecane (0.01 mole), 50 ml. $H_2O$, 1.2 grams sodium hydroxide and 0.01 gram sodium lauryl sulfate. The solution is stirred, and a solution of 1.69 grams (0.01 mole) dimethylmalonyl chloride in 25 ml. chloroform is added. The mixture is stirred for 5 minutes. The polyamide is recovered by filtration, washed free of surfactant with distilled water, and dried in a vacuum oven at 60° C. for 8 hours. The polyamide has an inherent viscosity of 0.52 dl/g (measured as a 0.4% solution in formic acid).

It is characteristic of the present invention polyamide resin compositions that they are more resistant to hydrolytic and chemically corrosive environments than conventional polyamide resins which do not have amido groups that are sterically hindered.

What is claimed is:

1. A polyamide block copolymer consisting essentially of a recurring combination of prepolymer residues corresponding to the formula:

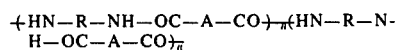

wherein the two prepolymer residues represented in the formula are different from each other, and wherein R is a divalent organic radical containing between one and about 20 carbon atoms; A is selected from the radicals

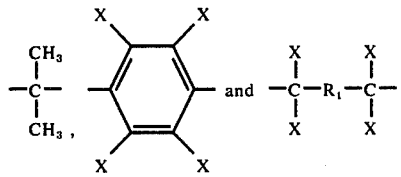

in which $R_1$ is a single bond or a divalent organic radical containing between one and about 12 carbon atoms, and X is selected from methyl and chlorine; and n is an integer between 3 and 20.

2. A polyamide block copolymer containing a recurring prepolymer condensate of equimolar proportions of ethylenediamine and α,α,α',α'-tetramethyl-p-phenylenediacetic acid, and containing a recurring prepolymer condensate of equimolar proportions of 1,12-dodecanediamine and α,α,α',α'-tetramethyl-p-phenylenediacetic acid.

3. A polyamide block copolymer containing a recurring prepolymer condensate of equimolar proportions of 1,3-diaminocyclohexane and tetramethylterephthalic acid, and containing a recurring prepolymer condensate of equimolar proportions of 1,8-diaminooctane and 2,3-dimethyl-2,3-dichlorosuccinic acid.

* * * * *